United States Patent
Kwon et al.

(10) Patent No.: US 12,304,466 B2
(45) Date of Patent: May 20, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Yongseok Kwon, Suwon-si (KR); Dae Seok Jeon, Hwaseong-si (KR); Dong Hyun Sung, Hwaseong-si (KR); Tae-Geun An, Yeongju-si (KR); Hyoungjong Wi, Seoul (KR); Joon Ho Lee, Seoul (KR); Eungseo Kim, Gwacheon-si (KR); Sangmin Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 225 days.

(21) Appl. No.: 18/081,129

(22) Filed: Dec. 14, 2022

(65) Prior Publication Data
US 2023/0398982 A1 Dec. 14, 2023

(30) Foreign Application Priority Data
Jun. 13, 2022 (KR) .......... 10-2022-0071260

(51) Int. Cl.
*B60W 30/09* (2012.01)
*B60W 40/02* (2006.01)
(Continued)

(52) U.S. Cl.
CPC ............ *B60W 30/09* (2013.01); *B60W 40/02* (2013.01); *B60W 50/14* (2013.01); *G01S 7/4802* (2013.01);
(Continued)

(58) Field of Classification Search
CPC ............... B60W 30/09; B60W 30/095; B60W 30/0956; B60W 40/02; B60W 50/14;
(Continued)

(56) References Cited

U.S. PATENT DOCUMENTS 10,308,245 B2 6/2019 Lee et al.
10,351,128 B2 7/2019 Sung et al.
(Continued)

FOREIGN PATENT DOCUMENTS

DE 102018105665 A1 * 9/2018 ............ B60W 30/09
KR 20180065585 A 6/2018
KR 20180066524 A 6/2018

*Primary Examiner* — Michael J Zanelli
(74) *Attorney, Agent, or Firm* — Lempia Summerfield Katz LLC

(57) ABSTRACT

A vehicle is equipped with a lidar installed on the vehicle to secure an external field of view of the vehicle and configured to obtain lidar data for detecting an object in the external field of view. The vehicle includes a controller including at least one processor configured to process the lidar data and perform an avoidance control or a warning control based on the processed results. In particular, the controller is further configured to generate a plurality of virtual lines in a moving direction of the vehicle within a full width of the vehicle, obtain a plurality of contour points of the object by processing the lidar data, and determine a collision risk for the avoidance control or the warning control based on the number of crossing points between the plurality of virtual lines and the plurality of contour points.

20 Claims, 12 Drawing Sheets

(51) Int. Cl.
    *B60W 50/14*     (2020.01)
    *G01S 7/48*     (2006.01)
    *G01S 17/931*     (2020.01)

(52) U.S. Cl.
    CPC ...... *G01S 17/931* (2020.01); *B60W 2050/143* (2013.01); *B60W 2420/408* (2024.01); *B60W 2554/80* (2020.02)

(58) Field of Classification Search
    CPC ... B60W 2050/143; B60W 2050/0004; B60W 2050/0043; B60W 2420/408; B60W 2420/90; B60W 2554/80; B60W 2554/20; B60W 2554/40; B60W 2552/50; G01S 7/4802; G01S 17/931; G01S 17/50; B60Y 2300/0954
    See application file for complete search history.

(56) References Cited

U.S. PATENT DOCUMENTS

| | | |
|---|---|---|
| 2018/0162386 A1 | 6/2018 | Lee et al. |
| 2018/0162387 A1 | 6/2018 | Sung et al. |
| 2022/0204029 A1* | 6/2022 | Chen ..................... G01S 17/42 |

* cited by examiner

FIG. 6

|  | 1 | 2 | 3 | 4 | 5 | 6 | 7 | 8 | 9 | 10 | 11 |
|---|---|---|---|---|---|---|---|---|---|---|---|
| $y_{12}$ | X | X | X | X | X | X | X | X | O | X | X |
| $y_{23}$ | X | X | X | X | X | X | X | X | X | X | X |
| $y_{34}$ | X | X | X | X | X | X | X | O | X | X | X |
| $y_{45}$ | X | X | X | X | X | X | O | X | X | X | X |
| $y_{56}$ | X | X | X | X | X | O | X | X | X | X | X |
| $y_{67}$ | X | X | X | O | O | X | X | X | X | X | X |
| $y_{78}$ | X | X | X | O | X | X | X | X | X | X | X |
| $y_{89}$ | X | O | O | X | X | X | X | X | X | X | X |
| $y_{910}$ | O | X | X | X | X | X | X | X | X | X | X |
| CROSSING OR NO CROSSING | O | O | O | O | O | O | O | O | O | X | X |

VEHICLE AND METHOD OF CONTROLLING THE SAME

CROSS-REFERENCE TO RELATED APPLICATION(S)

This application claims the benefit of and priority to Korean Patent Application No. 10-2022-0071260, filed on Jun. 13, 2022, in the Korean Intellectual Property Office, the disclosure of which is incorporated herein by reference.

TECHNICAL FIELD

The present disclosure relates to a vehicle and a method of controlling the vehicle, and more particularly, to a vehicle and a method of controlling the vehicle configured to avoid an obstacle other than a moving object.

BACKGROUND

The statements in this section merely provide background information related to the present disclosure and may not constitute prior art.

Vehicles in recent years are equipped with advanced driver assistance systems (ADAS) configured to detect objects such as moving objects or obstacles. The ADAS inform the driver of the objects or automatically perform avoidance controls.

The ADAS use image processing or sensor fusion using a camera or a radar to detect objects, but there is a limit to processing images of stationary structures such as guardrails, protective walls, drums, and the like.

On the other hand, a lidar is configured to implement 3-dimensional images that are not readily obtained from a camera using the reflection time that varies depending on structures. Effective utilization of the information obtained by the lidar allows accurate identification of stationary structures, thus leading to better provision against various types of collisions and prevention of unrequired avoidance controls.

SUMMARY

An aspect of the present disclosure provides a vehicle and a method of controlling the vehicle configured to utilize a lidar effectively.

According to an embodiment of the present disclosure, a vehicle is equipped with a lidar installed on the vehicle to secure an external field of view of the vehicle and configured to obtain lidar data for detecting an object in the external field of view. The vehicle includes a controller including at least one processor configured to process the lidar data and perform an avoidance control or a warning control based on the processing results. In particular, the controller is configured to generate a plurality of virtual lines in a moving direction of the vehicle within a full width of the vehicle, obtain a plurality of contour points of the object by processing the lidar data, and determine a collision risk for the avoidance control or the warning control based on the number of crossing points between the plurality of virtual lines and the plurality of contour points.

The controller may generate a first equation for the plurality of virtual lines, generate a second equation for the contour points, and obtain crossing points based on a first equation and a second equation.

The controller may output 1 for a first index when the number of the obtained crossing points is equal to or greater than a predetermined number and output 0 for the first index when the number of the obtained crossing points is less than the predetermined number.

The controller may obtain the minimum height and the maximum height of the plurality of contour points of the object, output 1 for a second index when the minimum height is less than the total height of the vehicle or the maximum height is greater than a predetermined height, and output 0 for the second index when the minimum height is greater than the total height of the vehicle or the maximum height is less than the predetermined height.

The controller may perform the avoidance control when both the output value of the first index and the output value of the second index are 1.

When a plurality of crossing points is present, the controller may decide on a crossing point closest to the vehicle among the plurality of crossing points and perform the avoidance control based on the closest crossing point.

When a plurality of crossing points is present, the controller may decide on a crossing point closest to the vehicle among the plurality of crossing points, obtain a time to collision (TTC) with the closest crossing point, output 1 for a third index when the TTC is equal to or less than a predetermined time, and output zero "0" for the third index when the TTC is greater than the predetermined time.

The controller may perform the avoidance control when both the output value of the first index and the output value of the third index are 1.

When a plurality of crossing points is present, the controller may decide on a crossing point closest to the vehicle among the plurality of crossing points, obtain a TTC with the closest crossing point, and output 1 for the third index when the TTC is equal to or less than the predetermined time. The controller may output 0 for the third index when the TTC is greater than the predetermined time. The controller may perform the avoidance control when the output value of the first index, the output value of the second index, and the output value of the third index are all 1.

The object may be a stationary obstacle of which no movement is detected.

According to an embodiment of the present disclosure, disclosed is a method of controlling a vehicle having a lidar configured to obtain lidar data and a controller configured to perform an avoidance control or a warning control based on the lidar data. In particular, the method comprises: generating a plurality of virtual lines in a moving direction of the vehicle within the full width of the vehicle; obtaining a plurality of contour points of an object by processing the lidar data; obtaining the number of crossing points between the plurality of virtual lines and the plurality of contour points; and determining a collision risk for the avoidance control or the warning control based on the number of crossing points.

According to an embodiment, the method of controlling the vehicle may further include: generating a first equation for the plurality of virtual lines, generating a second equation for the contour points, and obtaining the crossing points based on the first equation and the second equation.

According to one embodiment, the method of controlling the vehicle may further include outputting 1 for a first index when the number of obtained crossing points is equal to or greater than a predetermined number and outputting zero "0" for the first index when the number of obtained crossing points is less than the predetermined number.

According to another embodiment, the method of controlling the vehicle may further include: obtaining a minimum height and maximum height of the plurality of contour points of the object, outputting 1 for a second index when the minimum height is less than the total height of the vehicle or the maximum height is greater than a predetermined height, and outputting 0 for the second index when the minimum height is greater than the total height of the vehicle or the maximum height is less than the predetermined height.

The determination of the collision risk may include performing the avoidance control when both the output value of the first index and the output value of the second index are 1.

When a plurality of crossing points is present, the determination of the collision risk may include deciding on a crossing point closest to the vehicle and performing the avoidance control based on the closest crossing point.

According to the embodiment, when a plurality of crossing points is present, the method of controlling the vehicle may further include: deciding on a crossing point closest to the vehicle among the plurality of crossing points, obtaining a TTC with the closest crossing points, outputting 1 for a third index when the TTC is equal to or less than a predetermined time, and outputting 0 for the third index when the TTC is greater than the predetermined time.

The determination of the collision risk may further include performing the avoidance control when both the output value of the first index and the output value of the third index are 1.

According to the embodiment, when a plurality of crossing points is present, the method of controlling the vehicle may further include: deciding on a crossing point closest to the vehicle among the plurality of crossing points, obtaining a TTC with the closest crossing point, outputting 1 for the third index when the TTC is equal to or less than the predetermined time, outputting zero "0" for the third index when the TTC is greater than the predetermined time, and performing the avoidance control when the output value of the first index, the output value of the second index, and the output value of the third index are all 1.

The object may be a stationary obstacle of which no movement is detected.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 6 is a view illustrating an example of obtained crossing points;

DETAILED DESCRIPTION

Figure 1:
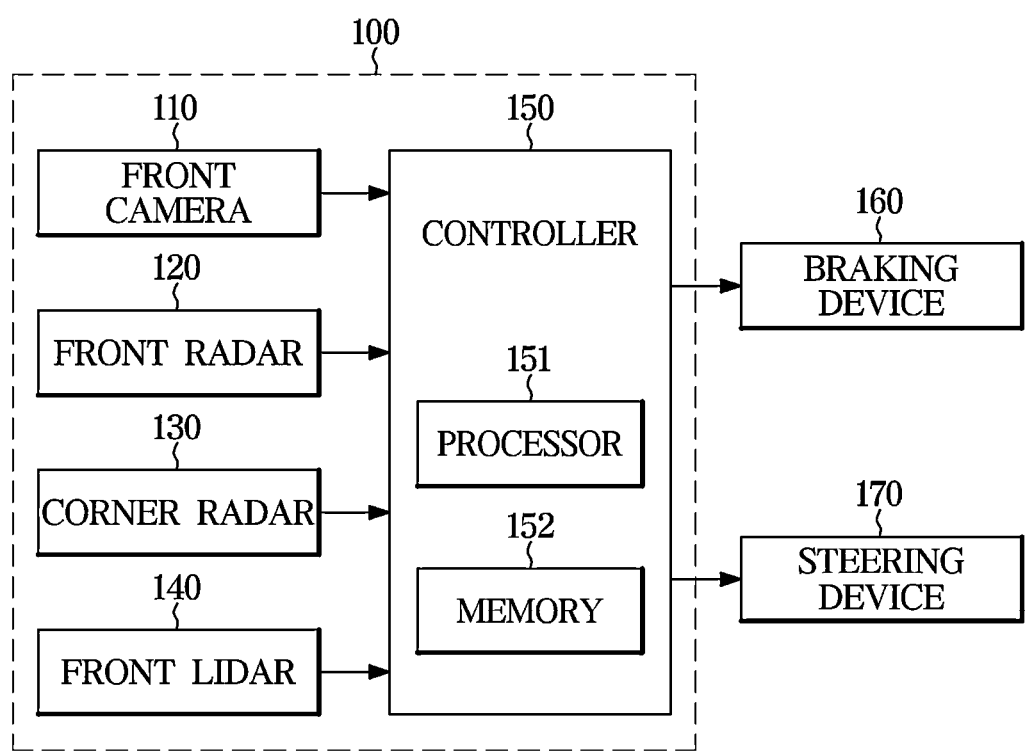
FIG. 1 is a block diagram illustrating a configuration of a vehicle according to an embodiment.

The like reference numerals refer to the like components throughout the specification. The present specification does not describe all elements of the embodiments, and the general content in the technical field to which the present disclosure pertains and the overlaps between embodiments have been omitted. The terms such as 'part, module, member, block' used in the specification may be implemented in software or hardware, and depending on embodiments, a plurality of 'parts, modules, members, blocks' may be implemented as a single component. A single 'part, module, member, block' may include a plurality of components.

When the specification reads that a part is "connected" to another part, it includes an indirect connection as well but a direct connection throughout the specification, and the indirect connection includes a connection via a wireless communication network. When a component, device, element, or the like of the present disclosure is described as having a purpose or performing an operation, function, or the like, the component, device, or element should be considered herein as being "configured to" meet that purpose or to perform that operation or function.

Further, when the specification reads that a part "includes" a component, it means that the part may further include other components rather than excluding other components unless otherwise stated.

When the specification reads that a member is positioned "on" another member, it includes a case where another member is present between the two members as well as a case where the two members border each other.

Terms such as first, second, etc. are used to distinguish one component from another, and the components are not limited by the terms.

Singular expressions include plural expressions unless the context explicitly indicates otherwise.

Identification numerals are used to facilitate description in respective steps and are not intended to describe the order of steps. Respective steps may be executed differently from the specified order unless the specific order is explicitly stated in the context.

Hereinafter, working principles and embodiments of the disclosure are described with reference to the accompanying drawings.

Figure 2:
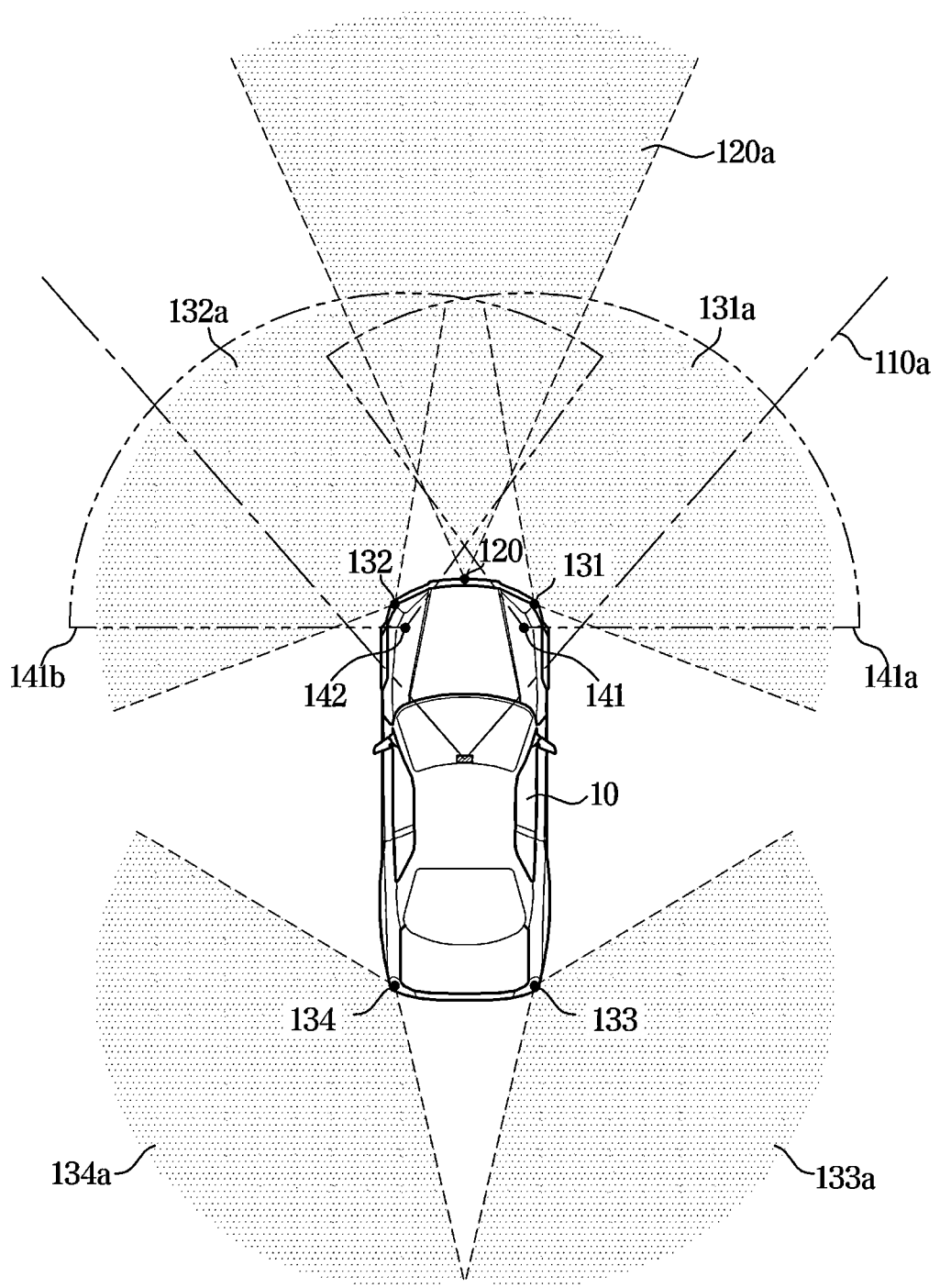
FIG. 2 is a view illustrating detection areas of a camera, radar, and lidar included in a vehicle according to an embodiment.

FIG. 1 is a block view illustrating a configuration of a vehicle control system according to an embodiment, and FIG. 2 is a view illustrating detection areas of a camera, radar, and lidar included in a vehicle according to the embodiment.

The vehicle 1 is equipped with a driver assistance system 100, a braking device 160, and a steering device 170.

The braking device 160 may temporarily brake the wheels of the vehicle 1 in response to the driver's intention to brake through the brake pedal, slip of the wheels, and/or the data processing result of the driver assistance system 100.

The steering device 170 may temporarily or continuously control the moving direction of the vehicle 1 in response to the driver's will to drive through a steering wheel and/or the data processing result of the driver assistance system 100.

The driver assistance system 100 may assist the driver to operate (drive, brake, steer) the vehicle 1. For example, the driver assistance system 100 may detect the environment (for example, other vehicles, pedestrians, cyclists, driving lanes, road signs, etc.) around the vehicle 1 and control the driving, braking, and/or steering of the vehicle 1 in response to the detected environment. Hereinafter, an object includes all other vehicles, cyclists, and the like which are objects that may collide with the traveling vehicle 1 in the surrounding environment.

A controller 150 may transmit a driving control signal, a braking signal, and a steering signal to the braking device 160 and/or the steering device 170 through a communication network NT.

The driver assistance system 100 may provide the driver with various functions. For example, the driver assistance system 100 may provide a lane departure warning (LDW), a lane keeping assist (LKA), a high beam assist (HBA), autonomous emergency braking (AER), traffic sign recognition (TSR), a smart cruise control (SCC), a blind spot detection (BSD), and the like.

The driver assistance system 100 may include a front camera 110, a front radar 120, and a plurality of corner radars 130: 131, 132, 133, 134.

The front camera 110 may be installed on the front windshield of the vehicle 1 to secure a field of view 110a (see FIG. 2) facing the front. The front camera may photograph the front of the vehicle 1 and obtain the image data of the front of the vehicle 1. The front camera 110 may detect an object moving in the front field of view or detect an object traveling in an adjacent lane in the front field of view. The image data of the front of the vehicle 1 may include location information on at least one of the other vehicles, pedestrians, cyclists, driving lanes, curbs, guardrails, roadside trees, and streetlights in front of the vehicle 1.

A side camera (not shown) may be additionally installed on the vehicle 1, and the side camera may be installed on the B-pillar side of the vehicle 1. The side camera may obtain image data on the side of the vehicle by photographing the side of the vehicle.

The front radar 120 may have a field of sensing 120a facing the front of the vehicle 1. The front radar 120 may be installed on a grille or a bumper of the vehicle 1, for example.

The front radar 120 may include a transmit antenna (or a transmit antenna array) emitting transmit radio waves toward the front of the vehicle 1 and a receive antenna (or a receive antenna array) receiving radio waves reflected by an obstacle.

The front radar 120 may obtain front radar data from the radio waves emitted by the transmit antenna and the reflected radio waves received by the receive antenna.

The front radar data may include location information and speed level of an object, such as, another vehicle, a pedestrian, or a cyclist, in front of the vehicle 1.

The front radar 120 may calculate the relative distance to an obstacle based on the phase difference (or time difference) between the transmit radio wave and the reflected radio wave and calculate the relative speed of the obstacle based on the frequency difference between the transmit radio wave and the reflected radio wave. The front radar 120 may transmit the front radar data to the controller 150.

A plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a facing the front right side of the vehicle 1. The first corner radar 131 may be installed on the right side of the front bumper of the vehicle 1.

The second corner radar 132 may have a field of sensing 132a facing the front left side of the vehicle 1 and may be installed on the left side of the front bumper of the vehicle 1.

The third corner radar 133 may have a field of sensing 133a facing the rear right side of the vehicle 1 and may be installed on the right side of the rear bumper of the vehicle 1.

The fourth corner radar 134 may have a field of sensing 134a facing the rear left side of the vehicle 1 and may be installed on the left side of the rear bumper of the vehicle 11.

The first, second, third, and fourth corner radars 131, 132, 133, 134 may respectively include a transmit antenna and a receive antenna.

The first, second, third, and fourth corner radars 131, 132, 133, 134 may respectively obtain first corner radar data, second corner radar data, third corner radar data, and fourth radar data.

The first corner radar data may include location information and speed level of an object located on the front right side of the vehicle 1.

The second corner radar data may include location information and speed level of an object located on the front left side of the vehicle 1.

The third and fourth corner radar data may include location information and speed level of an object located on the rear right side of the vehicle 1 and the rear left side of the vehicle 1.

The first, second, third, and fourth corner radars 131, 132, 133, 134 may respectively transmit the first, second, third, and fourth corner radar data to the controller 150.

Corner lidars 140: 141, 142 may be installed on the vehicle 1 to have an external field of view of the vehicle 1. For example, the lidar 140 may be installed on the front bumper, a radiator grille, a hood, a roof, a door, a side-view mirror, a tailgate, a trunk lid, or a fender. Corner lidar 140 is not limited to being provided on the corner side. The corner lidar 140 may be provided as a single sensor on any one of the central axes of the vehicle 1.

The corner lidar 140 includes a first corner lidar 141 installed on the front right side of the vehicle 1 and a second corner lidar 142 installed on the front left side of the vehicle 1.

The corner lidar 140 may receive data on numerous points on the outer surface of an object, obtain point cloud data which is a collection of the data on such points, and provide lidar data based on the point cloud data to the controller 150.

The controller 150 may process the image data of the front camera 110, the front radar data of the front radar 120, the corner radar data of the plurality of corner radars 130, and the lidar data of the corner lidar 140 and generate a control signal for controlling the braking device 160 and/or the steering device 170.

The controller 150 may include an image signal processor 151 which is a processor configured to process the image data of the front camera 110, a digital signal processor configured to process the radar data of the radars 120, 130, and/or a micro controller MCU configured to generate a braking signal.

The controller 150 may identify objects in the image based on the image information obtained by the front camera 110 and determine whether the objects in the image are obstacles in a stationary state or obstacles in a moving state by comparing the information on the identified objects with the object information stored in a memory 152 while performing a collision prevention mode.

The controller 150 may sense obstacles (for example, other vehicles, pedestrians, cyclists, curbs, guardrails, roadside trees, streetlights, etc.) in front of the vehicle 1 based on the lidar data.

The memory 152 may store programs and/or data for processing the image data, programs and/or data for processing the radar data, and programs and/or data for a processor 151 to generate a braking signal or a warning signal.

The memory 152 may temporarily store the image data received from the front camera 110 and/or the radar data received from the radars 120, 130 and temporarily store processing results of the image data and/or radar data of the memory 152.

The memory 152 may be implemented in at least one of, but not limited to, a nonvolatile memory element such as cache, read only memory (ROM), programmable ROM (PROM), erasable programmable ROM (EPROM), electrically erasable programmable ROM (EEPROM), and flash memory, a volatile memory such as random access memory (RAM), or a storage medium such as a hard disk drive (HDD) and CD-ROM.

The configurations for implementing the present disclosure and the operation of each configuration have been described above. Hereinafter, embodiments for performing various avoidance controls against obstacles other than moving objects based on the above-described configurations are described below.

Figure 3:
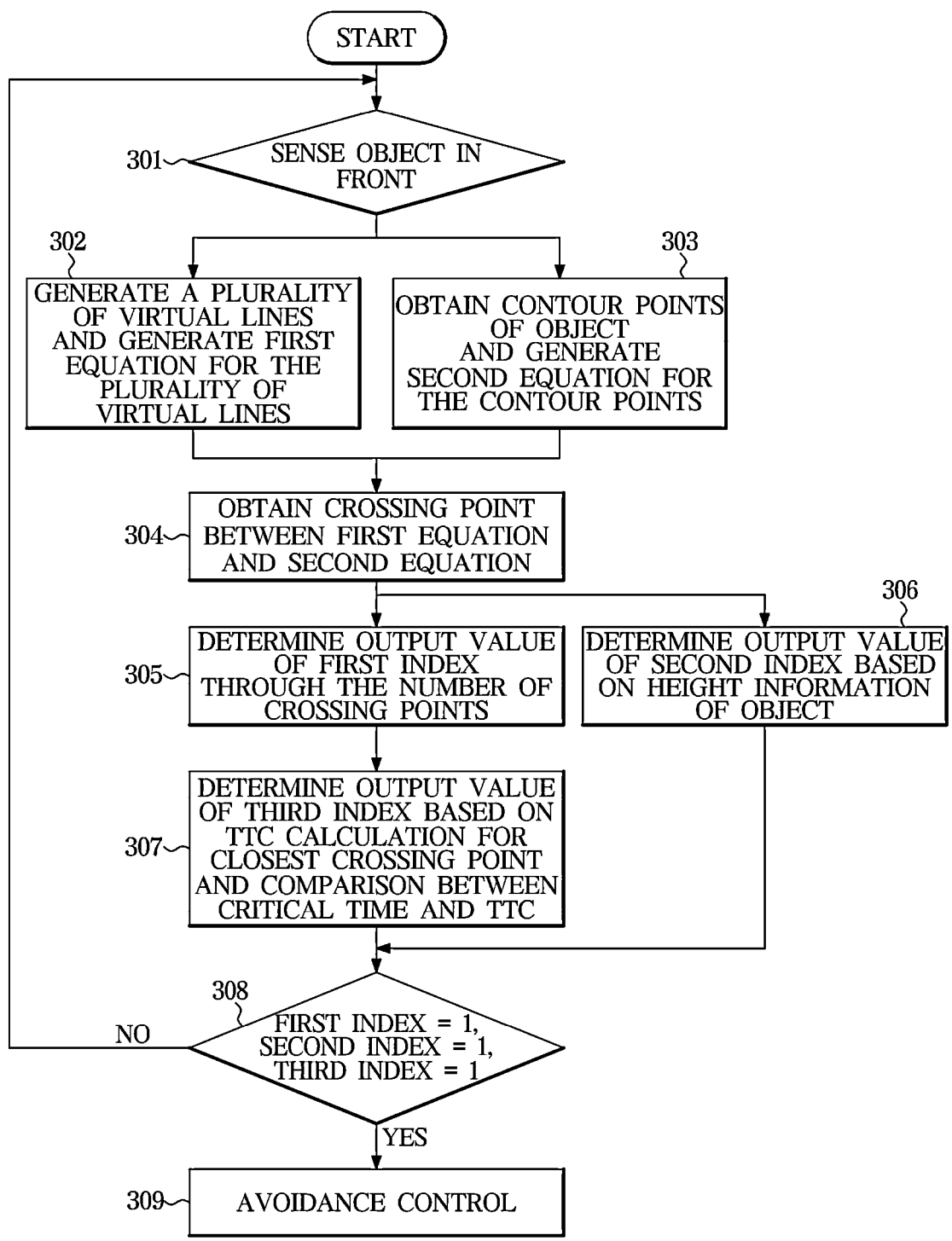
FIG. 3 is a flowchart of a method of controlling a vehicle according to an embodiment.
Figure 4A:
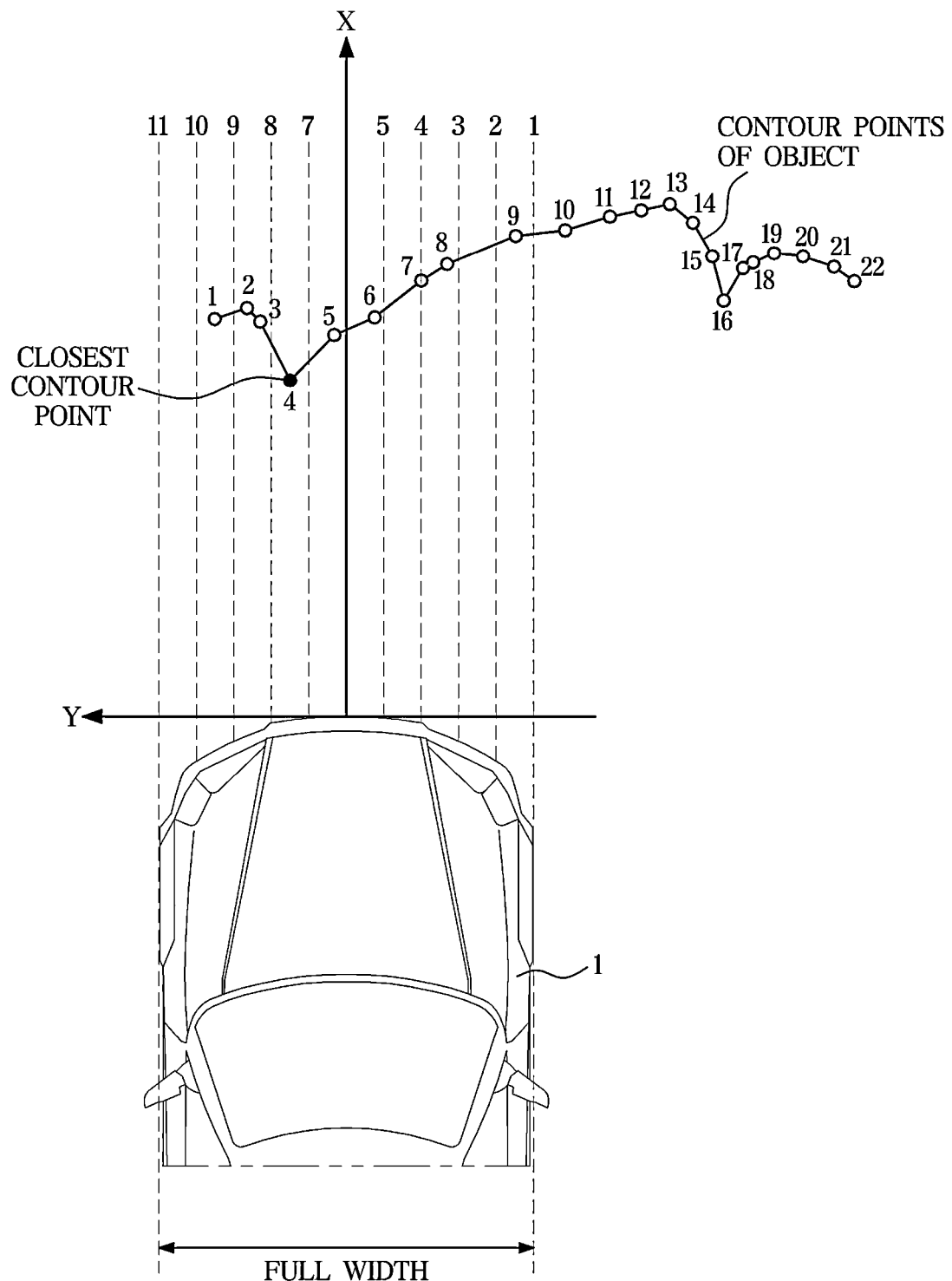
FIG. 4A and FIG. 4B shows a plurality of virtual lines and a plurality of contour points.
Figure 4B:
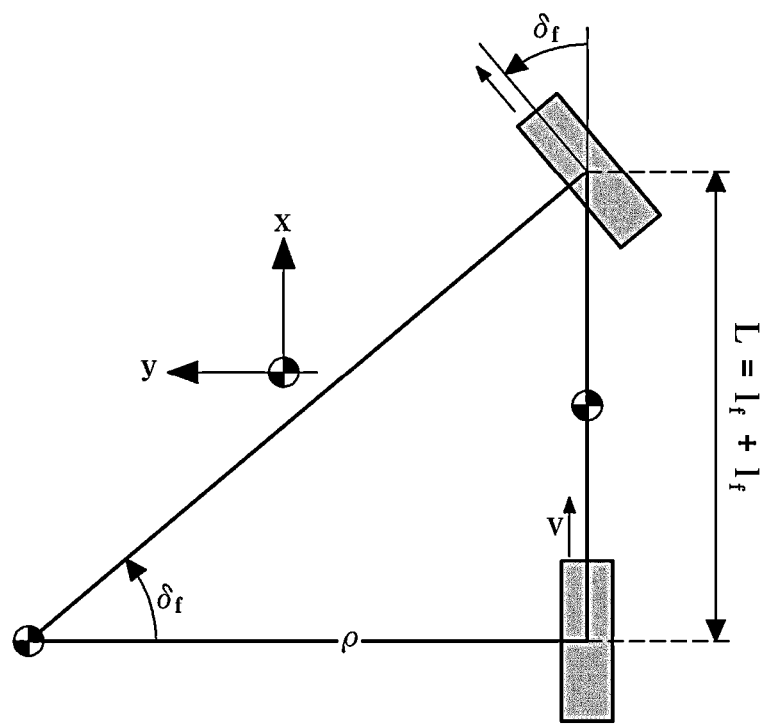
Figure 5:
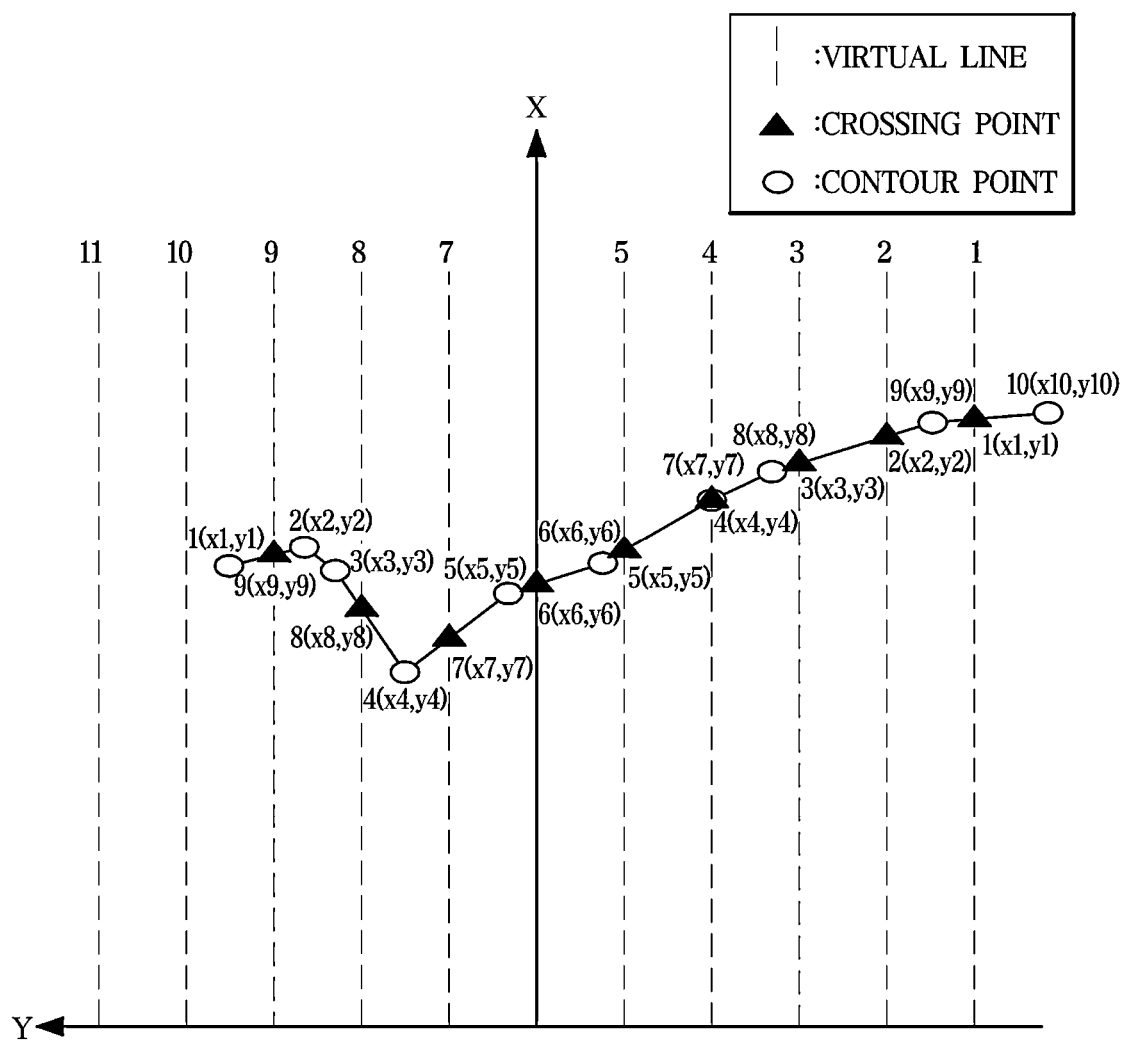
FIG. 5 is a view for describing the obtention of crossing points.
Figure 7:
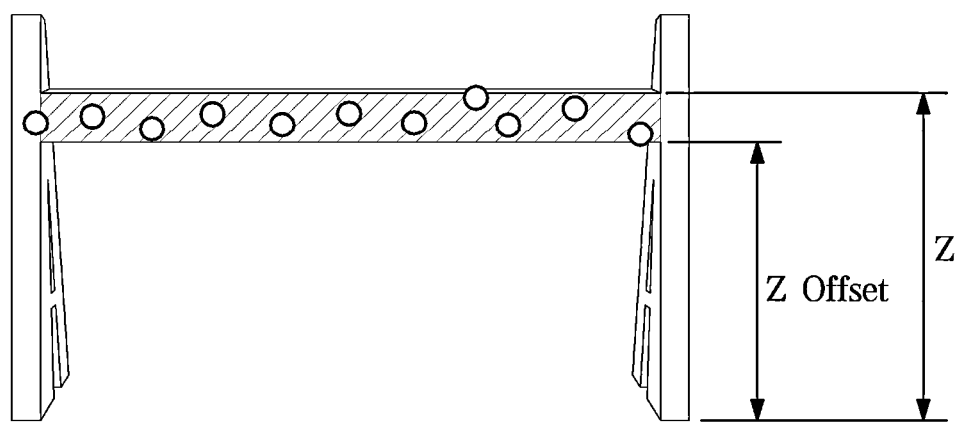
FIG. 7 is a view for describing a height and a height offset of an object.

FIG. 3 is a flowchart of a method of controlling a vehicle according to an embodiment, FIG. 4A and FIG. 4B illustrates a plurality of virtual lines and a plurality of contour points, FIG. 5 is a view for describing the obtention of crossing points, FIG. 6 is a view illustrating an example of obtained crossing points, and FIG. 7 is a view for describing a height and a height offset of an object. FIG. 3 is described in detail with reference to FIGS. 4A to 7.

The vehicle 1 senses an object in the front while traveling (301). Here, the object sensed by the vehicle 1 refers to an atypical stationary structure such as a guardrail, protective wall, drum, and the like rather than a typical collision avoidance target like other vehicles. In other words, according to an embodiment, the object may be a stationary obstacle of which no movement is sensed.

On the other hand, a subject sensing an object may be at least one or more of the front camera 110, the front radar 120, the corner radar 130, and the corner lidar 140. For example, the vehicle obtains lidar data through the corner lidar 140 and transmits the lidar data to the controller 150 if the object sensed through the front camera 110 in front is not a typical collision avoidance target like another vehicle.

The controller 150 generates a plurality of virtual lines in the moving direction of the vehicle 1 within the full width of the vehicle 1 and generates a first equation for the plurality of virtual lines (302).

FIG. 4A and FIG. 4B shows that the controller 150 may generate 11 virtual lines at predetermined intervals within a range of the full width. Unlike the illustration, the number of generated virtual lines may be less or more than 11 depending on the setting and the full width. The X-axis represents a longitudinal relative distance to the vehicle 1 and the Y-axis represents a lateral relative distance to the vehicle 1 in FIGS. 4A and 5.

The plurality of virtual lines may be implemented as a premise for determining whether the virtual lines overlap an object according to the first equation later. Here, the first equation may be implemented by the following Equation 1 with reference to the equation of a circle.

$$x^2+(y-\rho+n)^2=\rho^2 \quad \text{[Equation 1]}$$

where ρ=turning radius of the vehicle and
n=location of the virtual line from the origin, For example, the first equation for the sixth virtual line may be defined as $x^2+(y-\rho+n)^2=\rho 2$, and assuming the full width of the vehicle 1 to be 2 m, the first equation for the first virtual line may be defined as $x^2+(y-\rho-1)^2=(\rho+1)^2$ and the first equation for the eleventh virtual line may be defined as $x^2+(y-\rho+1)^2=(\rho-1)^2$.

When the vehicle 1 travels straight ahead, zero "0" is applied to ρ (turning radius). On the contrary, when the vehicle 1 travels in a curve, ρ (turning radius) is to be derived from the speed, wheelbase, and steering angle of the vehicle 1. When the vehicle 1 travels in a curve, the controller 150 may derive an equation for variable virtual lines with reference to the following Equation 2.

$$\Psi = \frac{v}{\rho} = \frac{v}{L}\tan\delta f \approx \frac{v}{L}\delta f \quad \text{[Equation 2]}$$

$$\rho = \frac{\Psi}{v} = \frac{\frac{v}{L}\tan\delta f}{v} = \frac{\tan\delta f}{L}$$

where v=speed of vehicle,
L=wheelbase, and
δf=steering angle

Further, the controller 150 obtains a contour point of the object and generates a second equation for the contour point (303). The contour point of the object refers to a point on the contour line of the side of the object viewed from a certain height of the vehicle. In other words, the controller 150 generates coordinate values (x, y) for a plurality of contour points on the contour line.

As illustrated in FIG. 5, when a plurality of contour points of the object are formed (e.g., 10 points), the controller 150 generates the second equation for the contour points.

The second equation may be implemented by the following Equation 3 with reference to a one-dimensional linear equation based on two adjacent contour points.

$$y(n-1)n = \frac{y_n - y_{n-1}}{(x_n - x_{n-1})}(x - x_{n-1}) + y_{n-1} \quad \text{[Equation 3]}$$

For example, the second equation between the first contour point and the second contour point may be defined as $$y12 = \frac{y2-y1}{(x2-x1)}(x-x1)+y1.$$

On the other hand, the controller 150 obtains a crossing point between the first equation and the second equation once both the first equation and the second equation are obtained.

The controller 150 may determine a crossing point by finding a solution to the simultaneous relationship between the first equation and the second equation.

For example, the solution may be obtained by substitution the second equation of y12, y23, . . . , y910 contour points into the first equation for the sixth virtual line.

The controller 150 determines that a crossing point exists when there is a solution to a simultaneous relationship and that no crossing point exists when there is no solution to the simultaneous relationship.

Such a process may be performed for all of the first to eleventh virtual lines. FIG. 6 shows a table that presents the determination results of the existence of the crossing points by finding out all solutions to the first to eleventh virtual lines.

The degree of overlap between the object and the expected path of the vehicle 1 may be estimated by deriving a crossing point through the relationship between the first equation and the second equation. As illustrated in FIG. 6, crossing points for the virtual lines except the tenth and eleventh virtual lines exist so that the probability of overlap with the object is estimated to be about 80%.

According to the embodiment, the controller 150 may determine that there is a possibility of collision with the object when the number of crossing points is equal to or greater than a predetermined number and control the vehicle 1 so that the avoidance control is performed.

Further, according to the embodiment, "1" may be outputted for a first index when the number of crossing points is equal to or greater than a predetermined number and zero "0" may be outputted for the first index when the number of crossing points is less than the predetermined number. Here, the first index corresponds to a condition for determining the possibility of collision with the object and starting the avoidance control.

On the other hand, the controller 150 may output a second index together with or separately from the first index and reflect the output value in the control condition.

The controller 150 decides the output value of the second index based on the height information of the object.

The controller 150 may obtain the minimum height and the maximum height among the plurality of contour points of the objects and output 1 for the second index when the minimum height of less than the total height of the vehicle 1 or the maximum height is greater than a predetermined height. For example, the vehicle 1 may not pass under the object when the minimum height of the object is less than the total height of the vehicle 1. The predetermined height may be a distance between the ground and the bottom surface of the vehicle 1. The vehicle 1 may not pass over the object when the maximum height of the object is greater than the predetermined height. The output value of the second index may be decided by reflecting such a point.

On the contrary, the controller 150 may output zero "0" for the second index when the minimum height is greater than the total height of the vehicle 1 or the maximum height is less than the predetermined height. For example, the vehicle 1 may not pass under the object when the minimum height of the object is greater than the total height of the vehicle. An example may be the vehicle 1 passing through a structure like a bridge. Further, the vehicle 1 may sufficiently pass over the object when the maximum height of the object is less than the predetermined height. An example is the vehicle 1 passing over an obstacle like a small rock.

As illustrated in FIG. 7, when the object has a sufficiently high minimum height (Z_offset) in a structure, the vehicle 1 may pass thereunder. Further, when the maximum height of the object is lower than the bottom surface of the vehicle 1, the vehicle 1 may sufficiently pass over.

According to the embodiment, the vehicle 1 may be controlled such that the avoidance control is performed against the object when both the output value of the first index and the output value of the second index are 1.

On the other hand, the controller 150 may output a value for a third index together with or separately from the first index and/or the second index and reflect the output value in the control condition.

The controller 150 may calculate a time to collision (TTC) with the closest crossing point and decide the output value of the third index based on the comparison between a critical time and the TTC.

When a plurality of crossing points exists, the controller 150 may decide on a crossing point closest to the vehicle among the plurality of crossing points, obtain the TTC with the closest crossing point, and output 1 for a third index when the TTC is equal to or less than a predetermined time. The controller 150 may output 0 for the third index when the TTC is greater than the predetermined time.

On the other hand, a reference value for outputting the third index may change depending on the location on the full width of the vehicle 1. The predetermined time, which serves as the reference value, may be set to a relatively larger value as the closest crossing point is closer to the center on the full width of the vehicle 1. The predetermined time may be set to a larger value as the closest crossing point is farther away from the center, thereby preventing a sensitive control. In other words, the predetermined time may have different values depending on the lateral position of the vehicle 1.

According to the embodiment, when a plurality of crossing points exists, the controller 150 may decide on a crossing point closest to the vehicle 1 among the plurality of crossing points and control the vehicle 1 such that the avoidance control is performed based on the closest crossing point.

According to the embodiment, the controller 150 may control the vehicle 1 such that the avoidance control is performed when both the output value of the first index and the output value of the third index are 1.

On the other hand, the controller 150 calculates the output value of at least one of the first index, the second index, and the third index and performs the avoidance control based on the output value.

In other words, the controller 150 determines a collision risk as a first step toward performing the avoidance control and considers the number of crossing points between the plurality of virtual lines and the plurality of contour points as a criterion for the determination of the collision risk. The controller 150 may perform a warning control for alerting the driver to the collision risk in addition to the avoidance control.

The controller 150 may perform the avoidance control for preventing a collision with the object when at least one of the first index, the second index, and the third index has the output value of 1.

According to the embodiment, the controller 150 may perform the avoidance control when the output value of the first index, the output value of the second index, and the output value of the third index are all 1.

Figure 8:
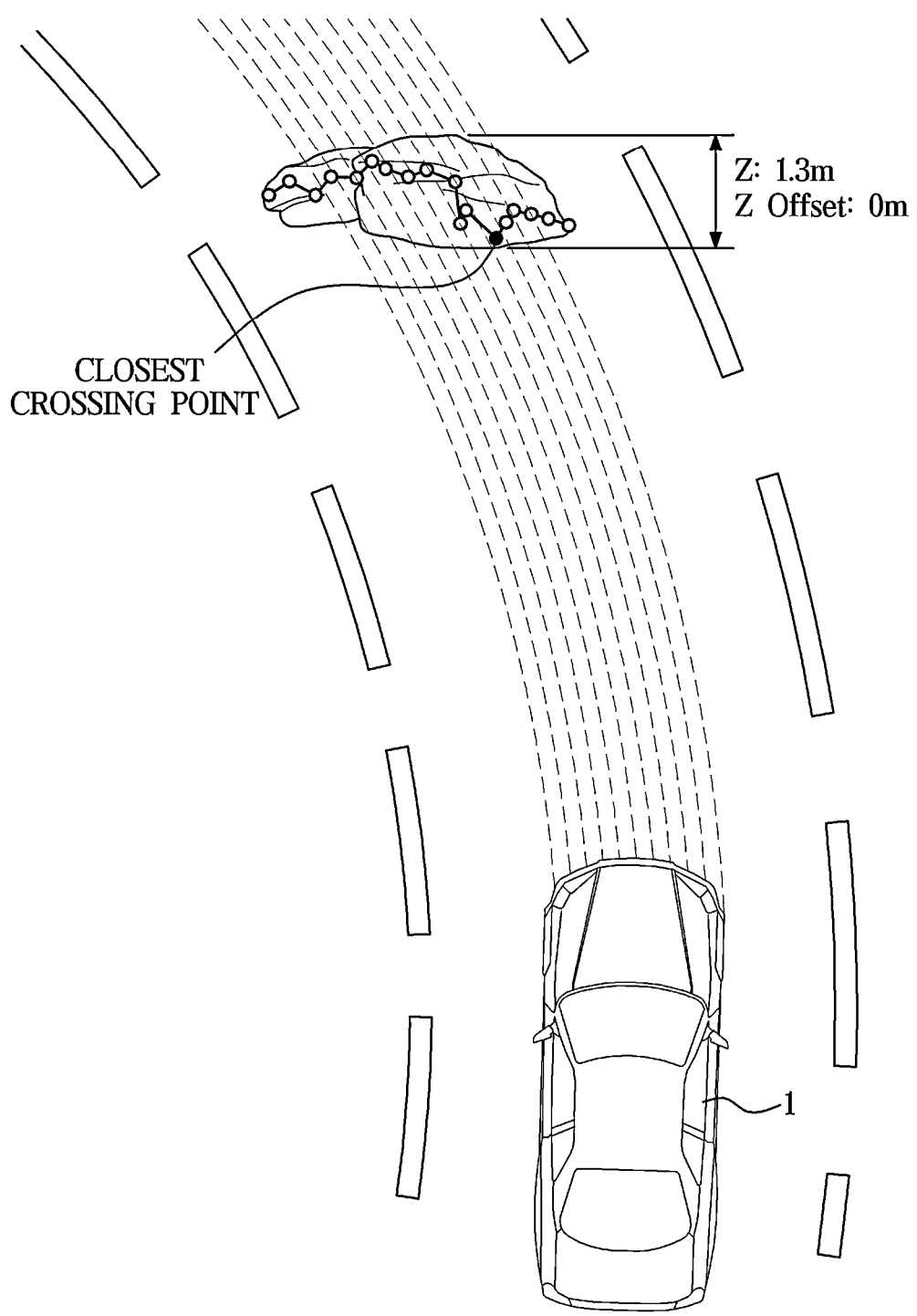
FIGS. 8 and 9 are views for describing a collision possibility according to the number of crossing points.
Figure 9:
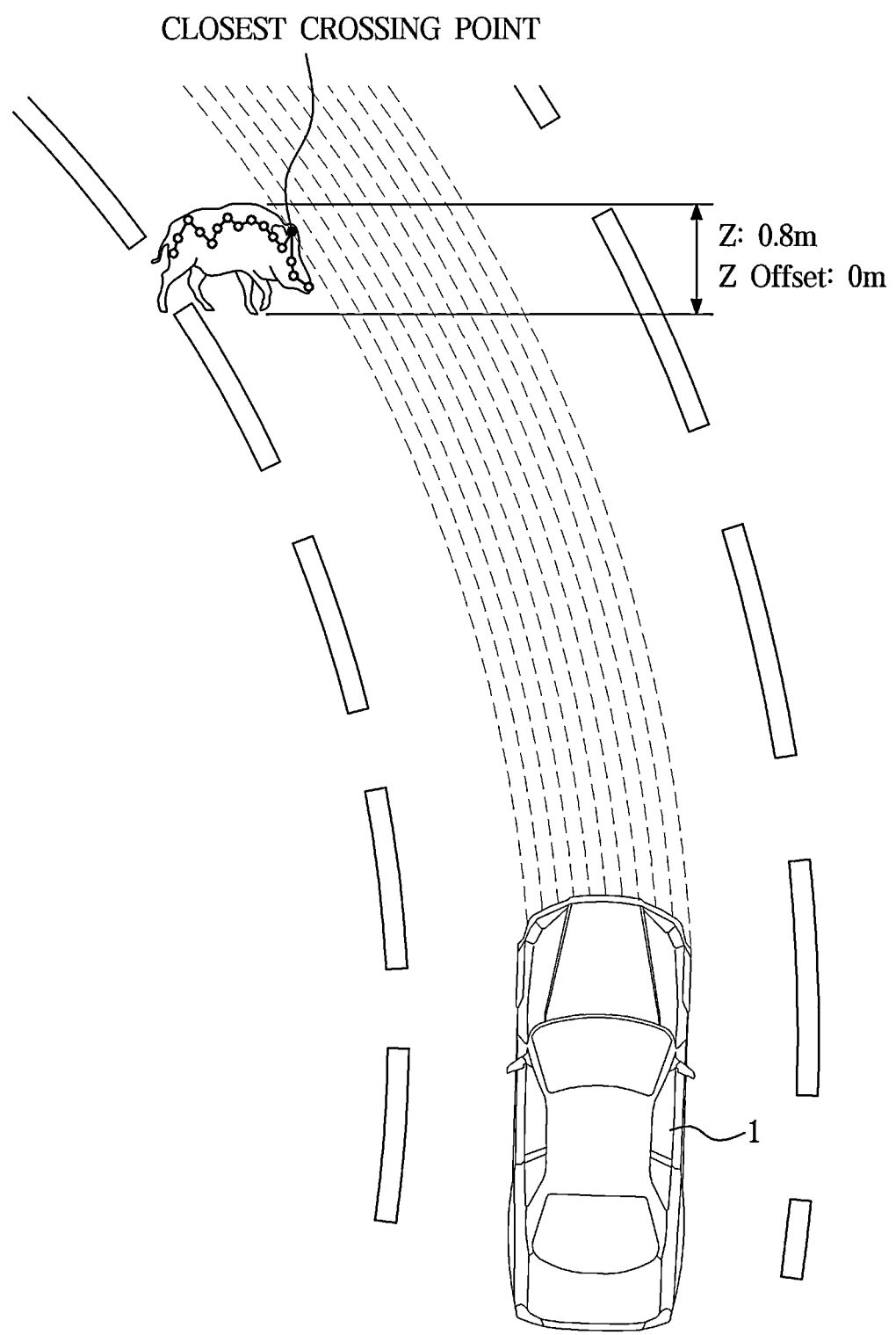

FIGS. 8 and 9 are views for describing a collision possibility according to the number of crossing points.

FIG. 8 shows that it is expected that "1" will be outputted for the first index as a result of performing the steps 301 to 305 in FIG. 3. Further, considering the maximum height and the minimum height of the object, it is also expected that "1" will be outputted for the second index. Further, it is expected that "1" will be outputted for the third index due to the expected collision with the closest crossing point, and control of the FCA and the like for avoiding the object will be activated according to the above-mentioned control conditions.

FIG. 9 shows that it is expected that zero "0" will be outputted for the first index since the number of crossing points does not meet the predetermined number as a result of performing the steps 01 to 305 in FIG. 3. In another form, "1" may be outputted for the second index and the third index, but the avoidance control may not be performed unlike the case of FIG. 8 since there is relatively little overlap with the object.

Figure 10:
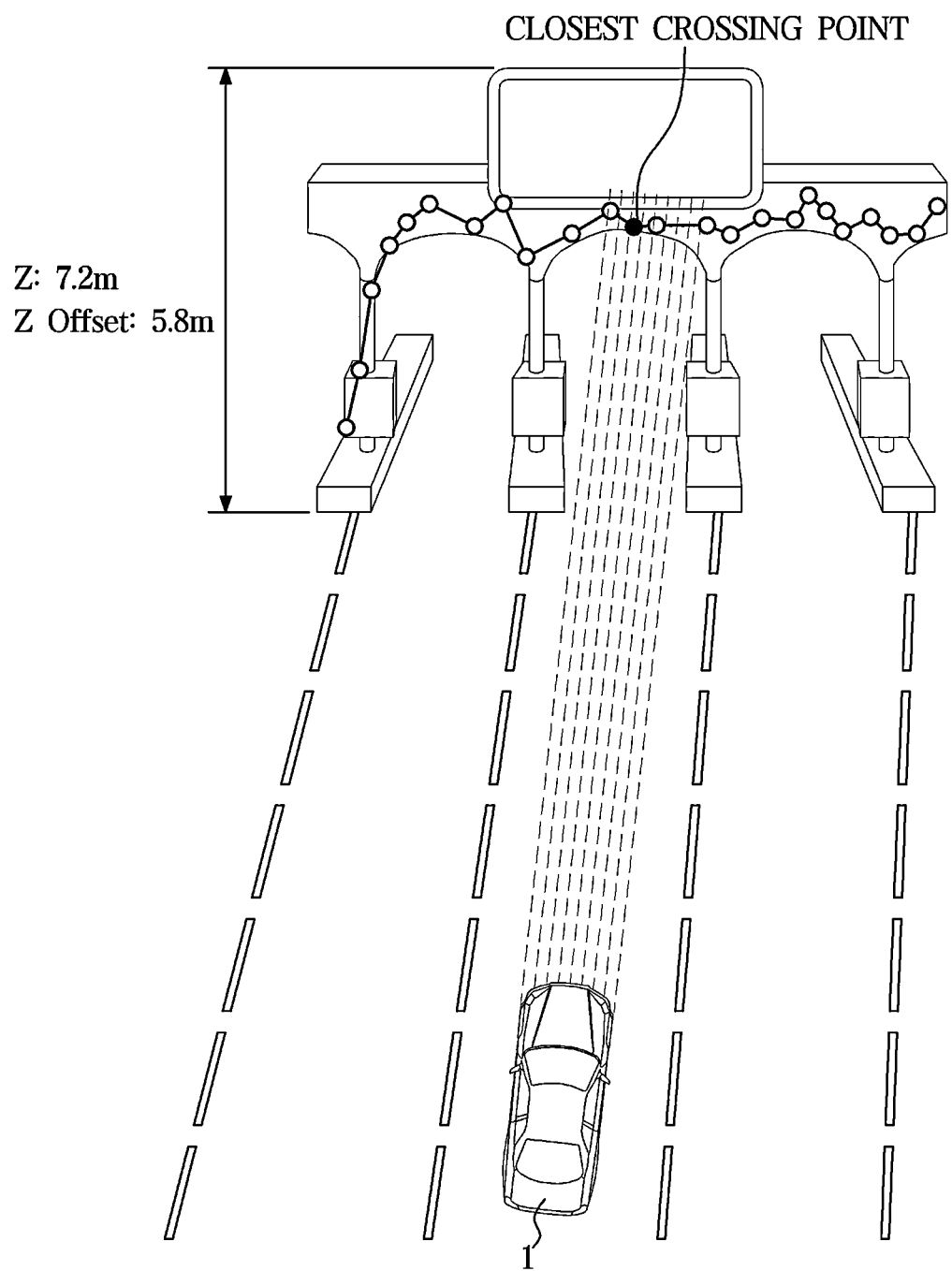
FIG. 10 is a view for describing a collision possibility according to a height offset.

FIG. 10 shows that it is expected that "1" will be outputted for the first index, but that zero "0" will be outputted for the second index since the minimum height of the object is greater than the total height of the vehicle. Accordingly, the control condition according to the present disclosure is not satisfied and the avoidance control will not be performed.

Figure 11:
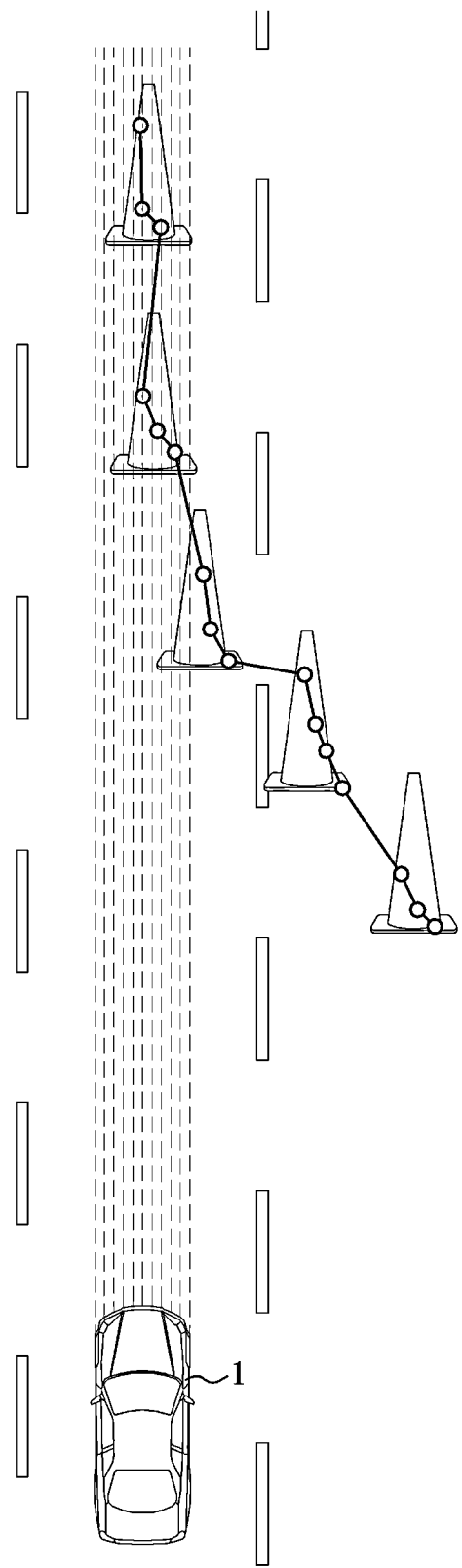
FIG. 11 is a view for describing a collision possibility according to the time to collision with the closest crossing point.

FIG. 11 is a view for describing a collision possibility according to the TTC with the closest crossing point. When a rubber cone is sensed by the front radar, a sensitive operation or malfunction are likely to occur. However, according to the present disclosure, "1" may be obtained for the output value of the first index by performing the steps 301 to 305, and "1" may be obtained for the output value of the second index depending on the maximum height and the minimum height of the rubber cone. Further, since there is a possibility of collision with the closest rubber cone, "1" may also be obtained for the output value of the third index so that control such as the FCA for avoiding the object will be activated according to the above-mentioned control conditions.

On the other hand, the embodiment of the present disclosure may be implemented in the form of a recording medium storing commands executable by a computer. The commands may be stored in the form of program code, and when executed by a processor, may generate program modules to execute the operation of the disclosed embodiment. The recording medium may be implemented as a computer-readable recording medium.

The computer-readable recording medium includes all types of recording mediums storing computer-readable commands. Examples of the computer-readable recording medium are a read-only memory (ROM), a random access memory (RAM), a magnetic tape, a magnetic disk, a flash memory, an optical data storage device, and the like.

According to an aspect of the present disclosure, the control target includes an atypical obstacle so that precise avoidance control may be performed.

The disclosed embodiments have been described with reference to the accompanying drawings thus far. It is to be understood by those having ordinary skill in the art to which the present disclosure pertains that the present disclosure may be implemented in forms other than the disclosed embodiments without modifying the technical spirit or essential features of the present disclosure. The disclosed embodiments are illustrative and are not to be construed as limiting.

What is claimed is:

1. A vehicle comprising:
   a lidar installed on the vehicle to secure an external field of view of the vehicle, the lidar configured to obtain lidar data for detecting an object in the external field of view; and
   a controller including at least one processor configured to process the lidar data and configured to perform an avoidance control or a warning control based on processed results,
   wherein the controller is further configured to:
      generate a plurality of virtual lines in a moving direction of the vehicle within an entire width of the vehicle,
      obtain a plurality of contour points of the object by processing the lidar data, and
      determine a collision risk for the avoidance control or the warning control based on a number of crossing points between the plurality of virtual lines and the plurality of contour points.

2. The vehicle of claim 1, wherein the controller is further configured to:
   generate a first equation for the plurality of virtual lines,
   generate a second equation for the contour points, and
   obtain the number of crossing points based on the first equation and the second equation.

3. The vehicle of claim 2, wherein the controller is further configured to:
   output "1" for a first index when the number of obtained crossing points is equal to or greater than a predetermined number and
   output zero "0" for the first index when the number of obtained crossing points is less than the predetermined number.

4. The vehicle of claim 3, wherein the controller is further configured to:
   obtain a minimum height and a maximum height of the plurality of contour points of the object,
   output "1" for a second index when the minimum height is less than total height of the vehicle or the maximum height is greater than a predetermined height, and
   output zero "0" for the second index when the minimum height is greater than the total height of the vehicle or the maximum height is less than the predetermined height.

5. The vehicle of claim 4, wherein the controller is further configured to perform the avoidance control when both the output value of the first index and the output value of the second index are 1.

6. The vehicle of claim 5, wherein the controller is further configured to:
   when a plurality of crossing points is present, decide on a crossing point closest to the vehicle among the plurality of crossing points and obtain a time to collision (TTC) with the closest crossing point,
   output "1" for a third index when the TTC is equal to or less than a predetermined time,
   output zero "0" for the third index when the TTC is greater than the predetermined time, and
   perform the avoidance control when the output value of the first index, the output value of the second index, and the output value of the third index are all 1.

7. The vehicle of claim 6, wherein the controller is further configured to set the predetermined time to a larger value as a lateral position of the closest crossing point is farther away from the center of the vehicle.

8. The vehicle of claim 4, wherein the controller is further configured to:
   when a plurality of crossing points is present, decide on a crossing point closest to the vehicle among the plurality of crossing points and obtain a time to collision (TTC) with the closest crossing point,
   output "1" for a third index when the TTC is equal to or less than a predetermined time, and
   output zero "0" for the third index when the TTC is greater than the predetermined time.

9. The vehicle of claim 8, wherein the controller is further configured to perform the avoidance control when both the output value of the first index and the output value of the third index are 1.

10. The vehicle of claim 1, wherein, the controller is further configured to:
when a plurality of crossing points is present, decide on a crossing point closest to the vehicle among the plurality of crossing points and
perform the avoidance control based on the closest crossing point.

11. A method of controlling a vehicle that includes a lidar configured to obtain lidar data and a controller configured to perform an avoidance control or a warning control based on the lidar data, the method comprising:
generating, by the controller, a plurality of virtual lines in a moving direction of the vehicle within a full width of the vehicle;
obtaining, by the controller, a plurality of contour points of an object by processing the lidar data;
obtaining, by the controller, a number of crossing points between the plurality of virtual lines and the plurality of contour points;
determining, by the controller, a collision risk for the avoidance control or the warning control based on the number of crossing points; and
performing the avoidance control or the warning control based on the determined collision risk.

12. The method of claim 11, further comprising:
generating a first equation for the plurality of virtual lines;
generating a second equation for the plurality of contour points; and
obtaining the number of crossing points based on the first equation and the second equation.

13. The method of claim 12, further comprising:
outputting "1" for a first index when the number of obtained crossing points is equal to or greater than a predetermined number; and
outputting zero "0" for the first index when the number of obtained crossing points is less than the predetermined number.

14. The method of claim 13, further comprising:
obtaining a minimum height and a maximum height of the plurality of contour points of the object;
outputting "1" for a second index when the minimum height is less than total height of the vehicle or the maximum height is greater than a predetermined height; and
outputting zero "0" for the second index when the minimum height is greater than the total height of the vehicle or the maximum height is less than the predetermined height.

15. The method of claim 14, further comprising:
performing the avoidance control when both the output value of the first index and the output value of the second index are 1.

16. The method of claim 15, further comprising:
when a plurality of crossing points is present, deciding on a crossing point closest to the vehicle among the plurality of crossing points and obtaining a time to collision (TTC) with the closest crossing point,
outputting "1" for a third index when the TTC is equal to or less than a predetermined time;
outputting zero "0" for the third index when the TTC is greater than the predetermined time; and
performing the avoidance control when the output value of the first index, the output value of the second index, and the output value of the third index are all "1".

17. The method of claim 16, wherein the predetermined time is set to a larger value as a lateral position of the closest crossing point is farther away from the center of the vehicle.

18. The method of claim 14, further comprising:
when a plurality of crossing points is present, deciding on a crossing point closest to the vehicle among the plurality of crossing points and obtaining a time to collision (TTC) with the closest crossing point;
outputting "1" for a third index when the TTC is equal to or less than a predetermined time; and
outputting zero "0" for the third index when the TTC is greater than the predetermined time.

19. The method of claim 18, further comprising:
determining an avoidance risk; and
performing the avoidance control when both the output value of the first index and the output value of the third index are "1".

20. The method of claim 11, further comprising:
when a plurality of crossing points is present, deciding on a crossing point closest to the vehicle among the plurality of crossing points and performing the avoidance control based on the closest crossing point.

* * * * *